United States Patent
Wu

(10) Patent No.: US 11,531,409 B2
(45) Date of Patent: Dec. 20, 2022

(54) STYLUS

(71) Applicant: Chicony Electronics Co., Ltd., New Taipei (TW)

(72) Inventor: Kuo-Nan Wu, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 17/388,036

(22) Filed: Jul. 29, 2021

(65) Prior Publication Data

US 2022/0308685 A1    Sep. 29, 2022

(30) Foreign Application Priority Data

Mar. 23, 2021    (TW) .................................. 110110304

(51) Int. Cl.
*G06F 3/038* (2013.01)
*G06F 3/0354* (2013.01)

(52) U.S. Cl.
CPC .......... *G06F 3/03545* (2013.01); *G06F 3/038* (2013.01)

(58) Field of Classification Search
CPC .... G06F 3/03545; G06F 3/0383; G06F 3/038; G06F 3/046; B43K 29/08; B43K 8/22; B43K 27/00; H01F 27/24; H01F 27/28
See application file for complete search history.

(56) References Cited

U.S. PATENT DOCUMENTS

| | | | |
|---|---|---|---|
| 10,331,243 B2 | 6/2019 | Katsurahira | |
| 2011/0192658 A1* | 8/2011 | Fukushima | G06F 3/03545 178/19.03 |
| 2015/0212605 A1* | 7/2015 | Lien | G06F 3/03545 345/179 |
| 2016/0018912 A1* | 1/2016 | Kaneda | G06F 3/033 345/179 |
| 2017/0108953 A1 | 4/2017 | Mao et al. | |
| 2017/0269719 A1* | 9/2017 | Tsai | G06F 1/169 |

FOREIGN PATENT DOCUMENTS

| | | | | |
|---|---|---|---|---|
| TW | 201145091 | | 12/2011 | |
| TW | M477617 | | 5/2014 | |
| TW | 201614434 | * | 4/2016 | ........... G06F 3/0354 |
| TW | I529568 | | 4/2016 | |
| TW | M589067 | | 1/2020 | |
| TW | 202014853 | | 4/2020 | |
| TW | M614079 | | 7/2021 | |

OTHER PUBLICATIONS

"Office Action of Taiwan Counterpart Application", dated Jan. 6, 2022, p. 1-p. 3.

* cited by examiner

*Primary Examiner* — Lunyi Lao
*Assistant Examiner* — Jarurat Suteerawongsa
(74) *Attorney, Agent, or Firm* — JCIPRNET

(57) ABSTRACT

A stylus includes a body, a carrying structure, and a tip structure. The carrying structure is disposed at the body and has a ring-shaped positioning portion, and the ring-shaped positioning portion has an axial hole. The tip structure is disposed on the carrying structure, a segment of the tip structure penetrates the axial hole, and the ring-shaped positioning portion entirely covers the segment of the tip structure along a peripheral direction of the axial hole.

10 Claims, 7 Drawing Sheets

STYLUS

CROSS-REFERENCE TO RELATED APPLICATION

This application claims the priority benefit of Taiwan application serial no. 110110304, filed on Mar. 23, 2021. The entirety of the above-mentioned patent application is hereby incorporated by reference herein and made a part of this specification.

BACKGROUND OF THE INVENTION

Field of the Invention

The invention relates to an input apparatus, and particularly relates to a stylus.

Description of Related Art

With the trend toward thinner and lighter portable electronic products such as smart phones and tablet computers, the size of the accompanying stylus is continuously reduced. In this case, the more parts the stylus has, the harder the assembly thereof, so that assembly accuracy is difficult to control. Therefore, how to reduce the number of parts of the stylus to reduce assembly difficulty and improve assembly accuracy is an important issue in the design of the stylus.

SUMMARY OF THE INVENTION

The invention provides a stylus having a simpler structure that is easy to assemble.

A stylus of the invention includes a body, a carrying structure, and a tip structure. The carrying structure is disposed at the body and has a ring-shaped positioning portion, and the ring-shaped positioning portion has an axial hole. The tip structure is disposed on the carrying structure, a segment of the tip structure penetrates the axial hole, and the ring-shaped positioning portion entirely covers the segment of the tip structure along a peripheral direction of the axial hole.

In an embodiment of the invention, the tip structure includes a tip and a sleeve, the sleeve is sleeved at one end of the tip and penetrates the axial hole, and another end of the tip is extended out of the body.

In an embodiment of the invention, the stylus includes a sensing device and a trigger device, wherein the sensing device is disposed in the body, the trigger device is disposed at one end of the tip structure and faces the sensing device, and the tip structure is adapted to be moved into the body so that the trigger device is in contact with the sensing device.

In an embodiment of the invention, the carrying structure has a break hole, and the trigger device is exposed by the break hole in a radial direction of the stylus.

In an embodiment of the invention, the stylus includes a control circuit board, wherein the sensing device is coupled to the control circuit board, and the carrying structure carries the control circuit board.

In an embodiment of the invention, the stylus includes an elastic member, wherein the carrying structure has a first stop portion, the elastic member is confined between the first stop portion and the tip structure, and the tip structure is suitable for resisting an elastic force of the elastic member to be moved into the body and is suitable for resetting via the elastic force of the elastic member.

In an embodiment of the invention, the elastic member is a spring and is sleeved at the tip structure, and two opposite ends of the spring are abutted against the first stop portion and the tip structure, respectively.

In an embodiment of the invention, the tip structure has a flange, the carrying structure has a second stop portion opposite to the first stop portion, and the flange is abutted against the second stop portion via the elastic force of the elastic member.

In an embodiment of the invention, the carrying structure has a break hole, and the elastic member is exposed by the break hole in a radial direction of the stylus.

In an embodiment of the invention, the stylus includes a cover, wherein the cover is combined with the carrying structure to cover a portion of the tip structure.

In an embodiment of the invention, the stylus includes an elastic member and a control circuit board, wherein the carrying structure has a first stop portion, a second stop portion, and a carrying portion, a portion of the tip structure and the elastic member are confined between the first stop portion and the second stop portion, the carrying portion carries the control circuit board, and the ring-shaped positioning portion, the first stop portion, the second stop portion, and the carrying portion are an integrally formed structure.

Based on the above, in the stylus of the invention, the carrying structure entirely surrounds the tip structure via the ring-shaped positioning portion thereof, so as to accurately position the tip structure to provide good concentricity thereto. Accordingly, additional parts are not needed to coordinate with the carrying structure for positioning the tip structure, and the number of parts of the stylus may be reduced to reduce assembly difficulty and improve assembly accuracy.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
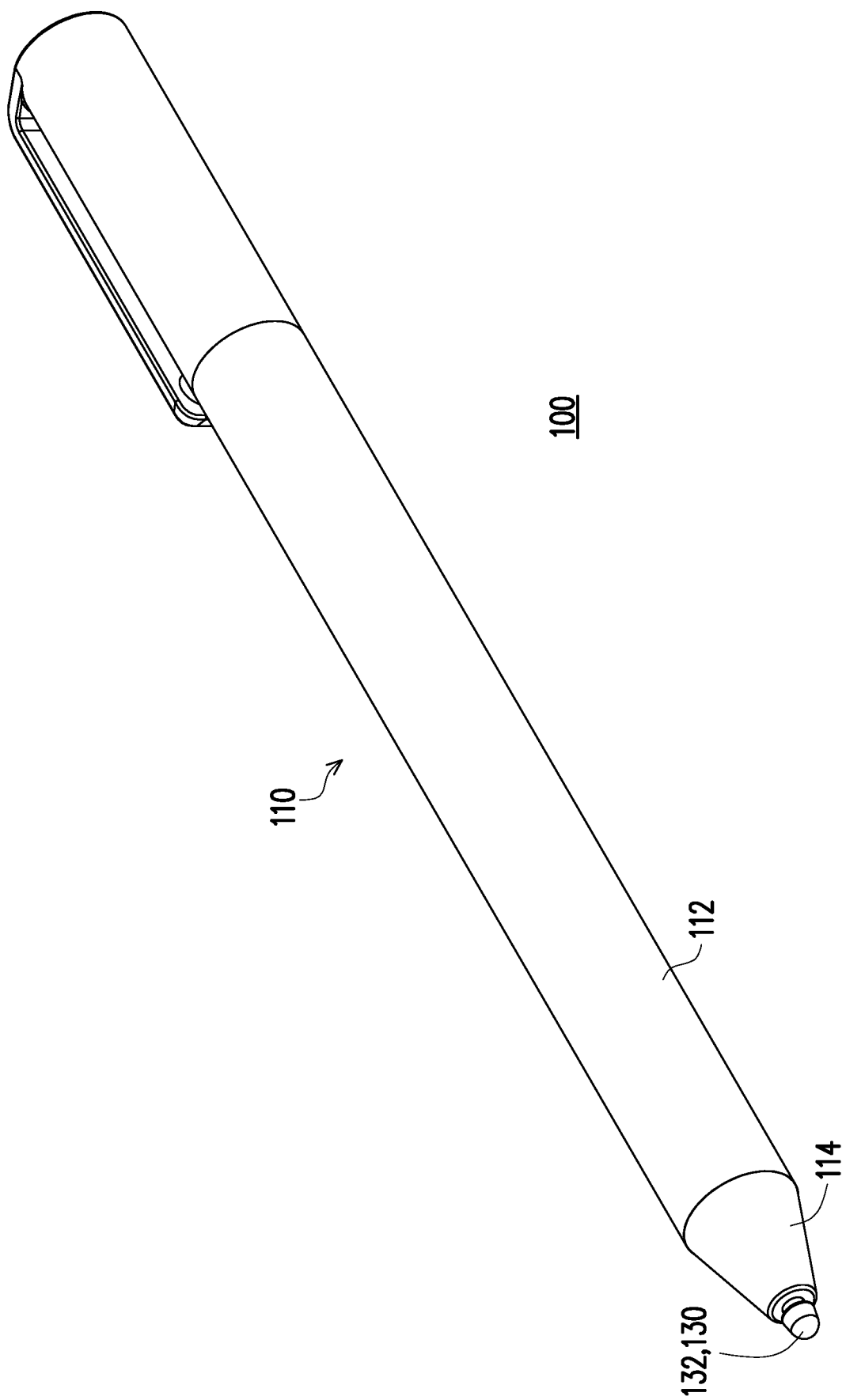
FIG. 1 is a perspective view of a stylus of an embodiment of the invention.

In the following, a plurality of embodiments of the content of the invention are disclosed with reference to figures, and for clarity, many practical details are also provided. However, it should be understood that, the practical details should not be used to limit the content of the disclosure. In other words, in some embodiments of the content of the invention, these practical details are not necessary. Moreover, to simplify the figures, some known conventional structures and devices are shown as simple schematics in the figures. The same reference numerals are used to indicate the same or similar devices in all the figures.

FIG. 1 is a perspective view of a stylus of an embodiment of the invention.

Figure 2:
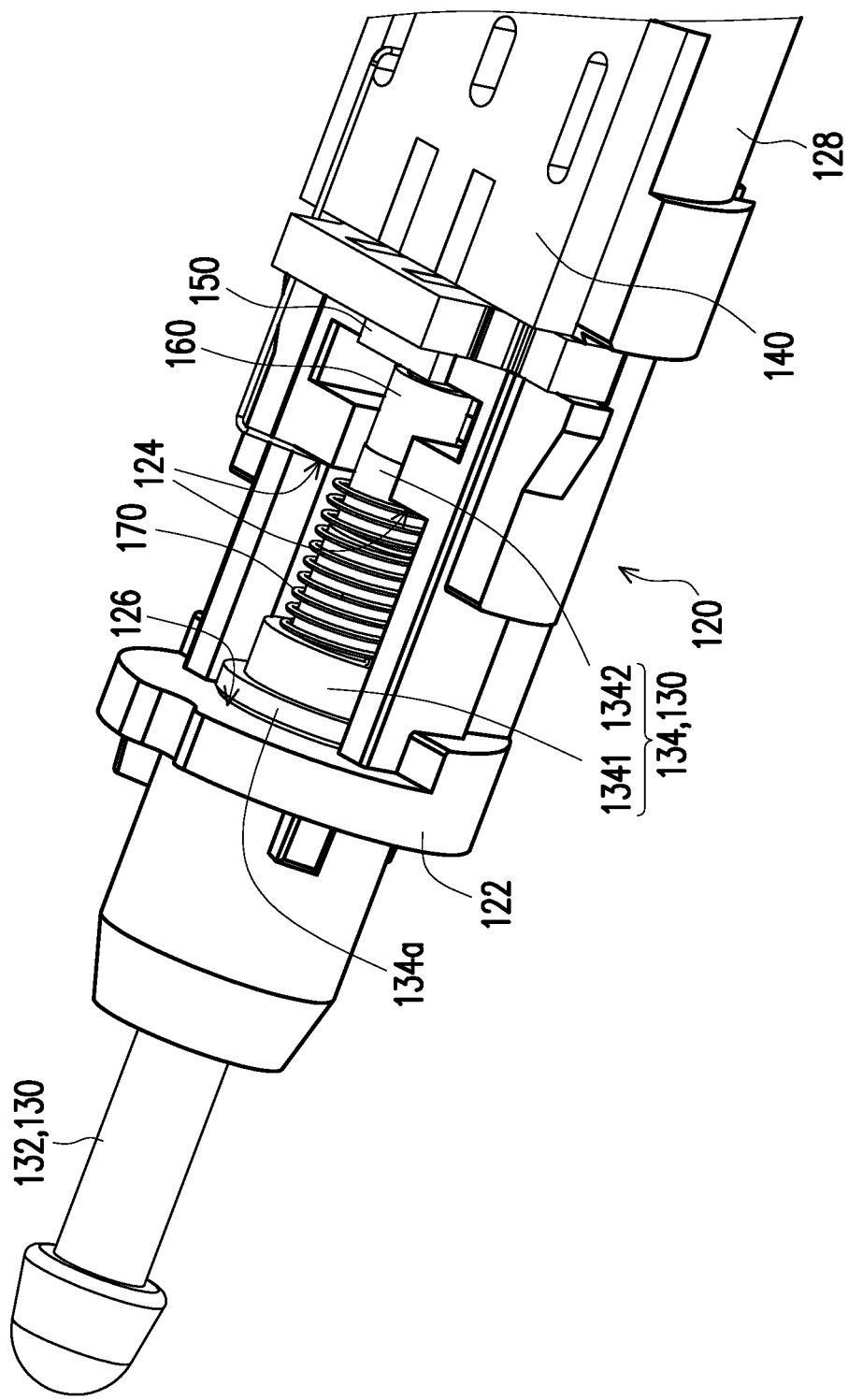
FIG. 2 is a partial perspective view of the stylus of FIG. 1.

FIG. 2 is a partial perspective view of the stylus of FIG. 1.

Figure 3:
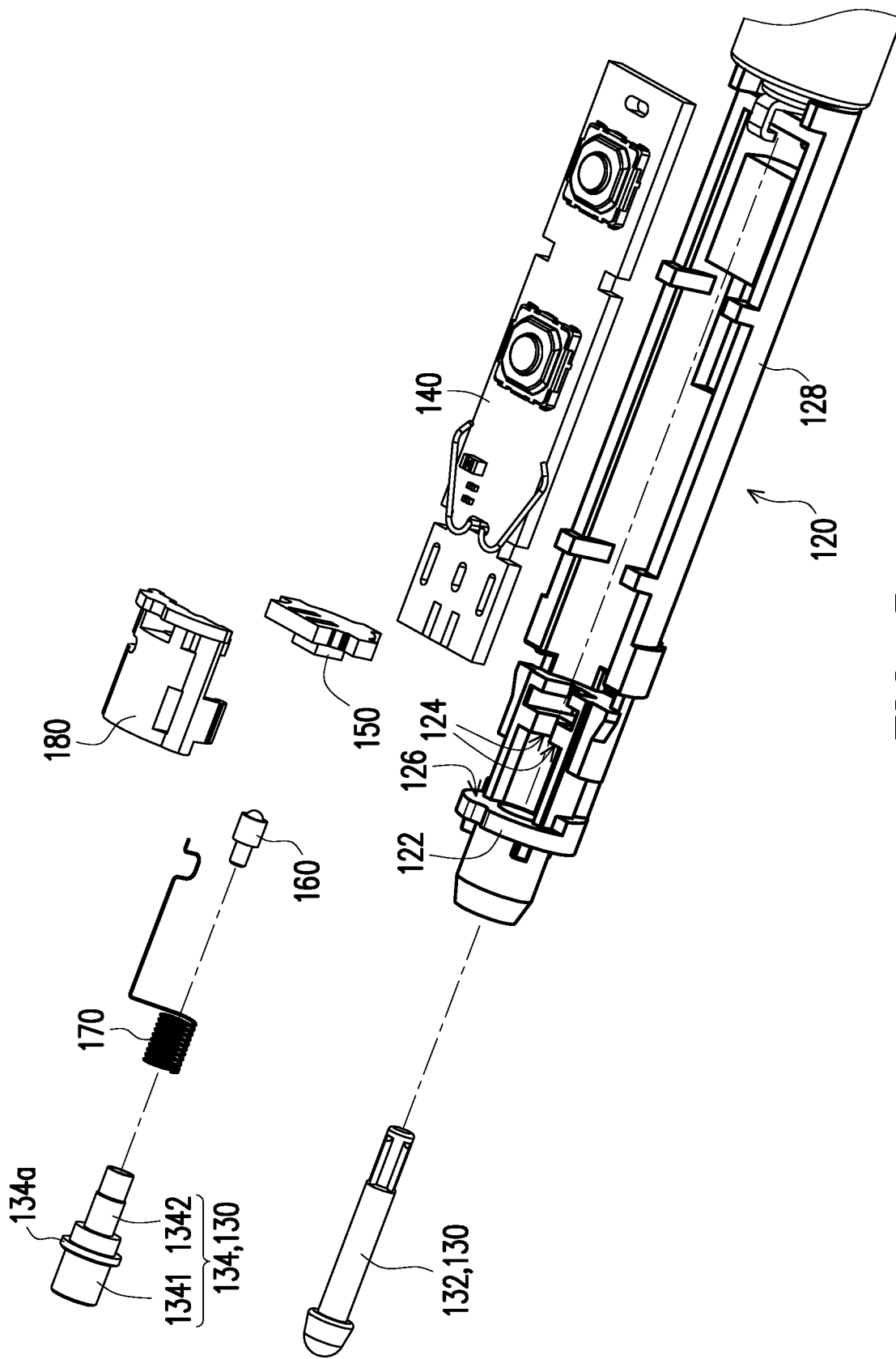
FIG. 3 is an exploded view of a portion of the members of the stylus of FIG. 1.

FIG. 3 is an exploded view of a portion of the members of the stylus of FIG. 1. Referring to FIG. 1 to FIG. 3, a stylus 100 of the present embodiment includes a body 110, a carrying structure 120, a tip structure 130, and a control circuit board 140. The body 110 includes a pole 112 and a tip cover 114. The carrying structure 120 is disposed in the body 110 and shielded by the pole 112 and the tip cover 114, and the carrying structure 120 carries the control circuit board 140 via a carrying portion 128 thereof. The tip structure 130 is disposed on the carrying structure 120 and extended out from the tip cover 114 to be suitable for touch control.

Figure 4:
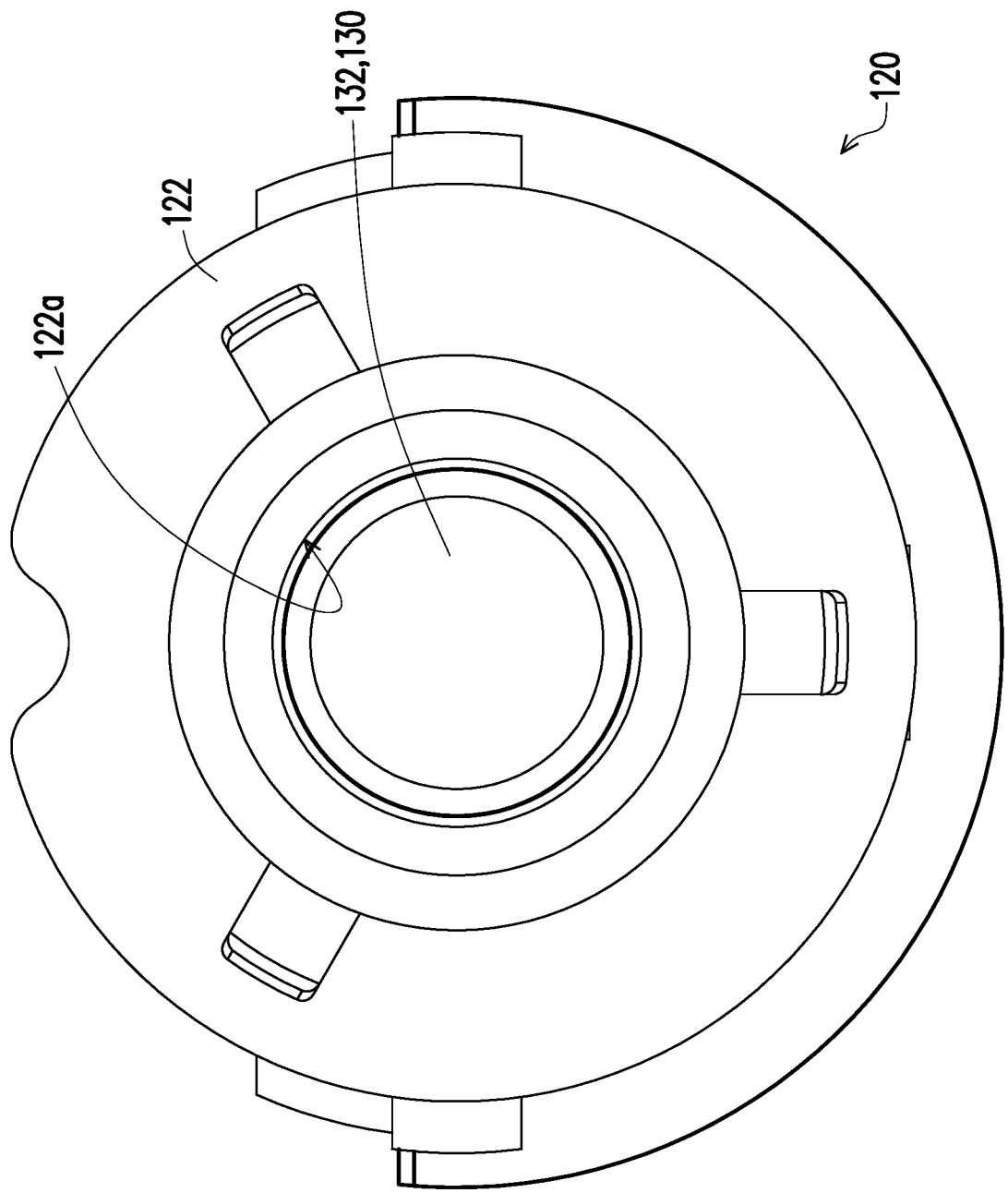
FIG. 4 is a front view of a portion of the members of the stylus of FIG. 2.

FIG. 4 is a front view of a portion of the members of the stylus of FIG. 2.

Figure 5:
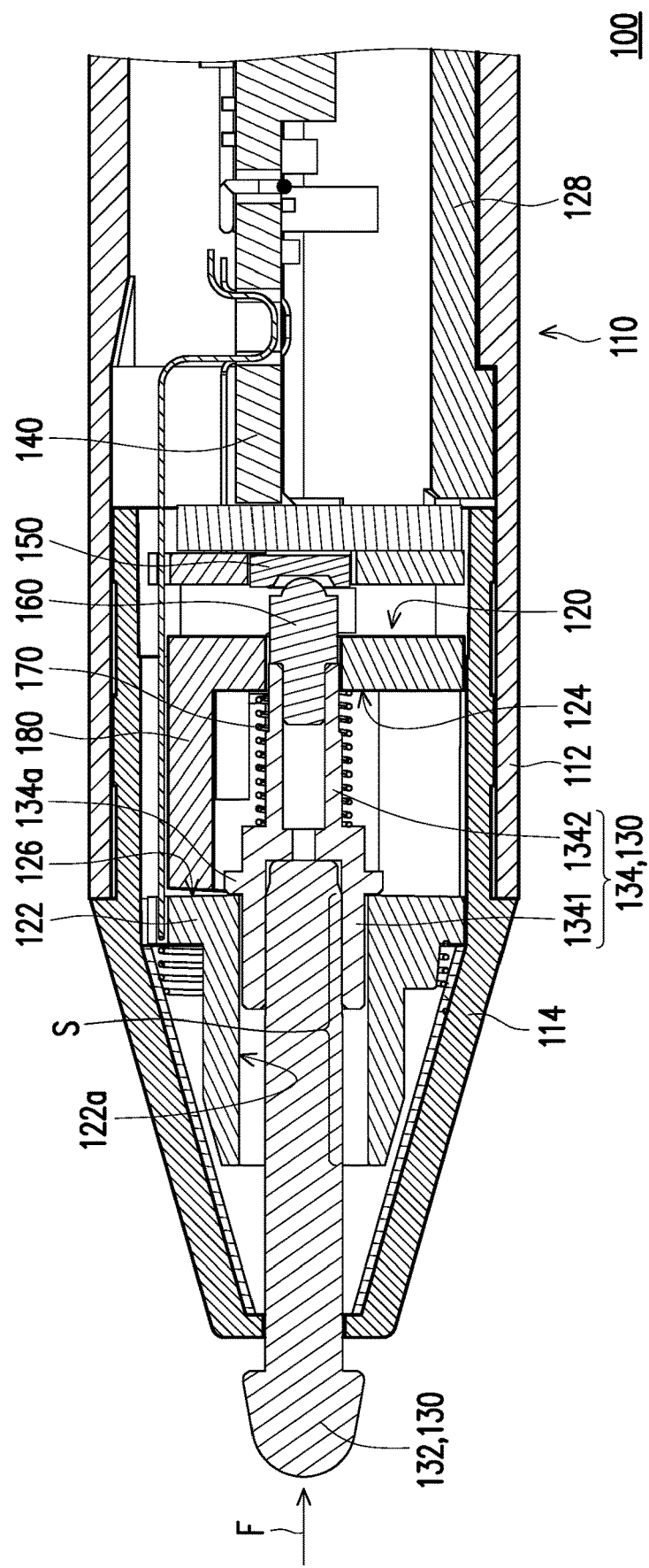
FIG. 5 is a partial cross-sectional view of the stylus of FIG. 1.

FIG. 5 is a partial cross-sectional view of the stylus of FIG. 1. Referring to FIG. 2 to FIG. 5, the carrying structure 120 of the present embodiment has a ring-shaped positioning portion 122, and the ring-shaped positioning portion 122 has an axial hole 122a. A segment S (marked in FIG. 5) of the tip structure 130 penetrates the axial hole 122a, and the ring-shaped positioning portion 122 entirely covers the segment S of the tip structure 130 along the peripheral direction of the axial hole 122a. That is, the carrying structure 120 entirely surrounds the tip structure 130 via the ring-shaped positioning portion 122 thereof. Therefore, the carrying structure 120 may truly position the tip structure 130 to provide good concentricity thereto. Accordingly, additional parts are not needed to coordinate with the carrying structure 120 for positioning the tip structure 130, and the number of parts of the stylus 100 may be reduced to reduce assembly difficulty and improve assembly accuracy.

Referring to FIG. 2, FIG. 3, and FIG. 5, specifically, the tip structure 130 of the present embodiment includes a tip 132 and a sleeve 134. A first portion 1341 of the sleeve 134 is sleeved at one end of the tip 132 and penetrates the axial hole 122a, and another end of the tip 132 is extended out of the body 110 at the tip cover 114. In addition, the stylus 100 further includes a sensing device 150 and a trigger device 160. The sensing device 150 is disposed in the body 110 and coupled to the control circuit board 140. The trigger device 160 is, for example, a rubber member, and is disposed at a second portion 1342 of the sleeve 134 of the tip structure 130 and faces the sensing device 150. The tip structure 130 is adapted to be forced to move into the body 110 so that the trigger device 160 is in contact with the sensing device 150, thereby generating a touch signal. In the present embodiment, the sensing device 150 is, for example, a pressure sensor, but the invention is not limited thereto. In other embodiments, the sensing device 150 may be an optical sensor, a magnetic sensor, or other types of sensors.

More specifically, in the present embodiment, the stylus 100 further includes an elastic member 170. The carrying structure 120 has a first stop portion 124 and a second stop portion 126 opposite to the first stop portion 124. A portion of the tip structure 130 and the elastic member 170 are confined between the first stop portion 124 and the second stop portion 126, so that the elastic member 170 provides an elastic force to act on the tip structure 130. Specifically, the sleeve 134 of the tip structure 130 has a flange 134a at the first portion 1341 thereof, and the flange 134a is abutted against the second stop portion 126. The elastic member 170 is, for example, a spring and is sleeved at the second portion 1342 of the sleeve 134 of the tip structure 130. The two opposite ends of the spring are respectively abutted against the first stop portion 124 and the first portion 1341 of the sleeve 134 of the tip structure 130, so that the spring is confined between the first stop portion 124 and the sleeve 134 of the tip structure 130, and an elastic force is applied to the first portion 1341 of the sleeve 134. Via this configuration, when the tip 132 of the tip structure 130 is subjected to an external force (for example, an external force F from left to right in FIG. 5), the tip structure 130 resists the elastic force of the elastic member 170 and is moved into the body 110 so that the trigger device 160 is in contact with the sensing device 150 as described above. Moreover, when the tip 132 is no longer subjected to the external force, the tip structure 130 may be reset via the elastic force of the elastic member 170.

In the present embodiment, the ring-shaped positioning portion 122, the first stop portion 124, the second stop portion 126, and the carrying portion 128 of the carrying structure 120 are an integrally formed structure. That is, the stylus 100 of the present embodiment fulfills the assembly requirements such as the positioning of the tip structure 130, the confinement of the elastic member 170, and the carrying of the control circuit board 140 via only the carrying structure 120 without providing a plurality of members to complete these assembly requirements. Therefore, the number of parts may be significantly reduced and assembly accuracy may be improved. In this way, the distance (such as 0.05 millimeters (mm) to 0.1 mm) between the trigger device 160 and the sensing device 150 may be accurately controlled to ensure the trigger device 160 and the sensing device 150 have good touch sensing effect.

Figure 6:
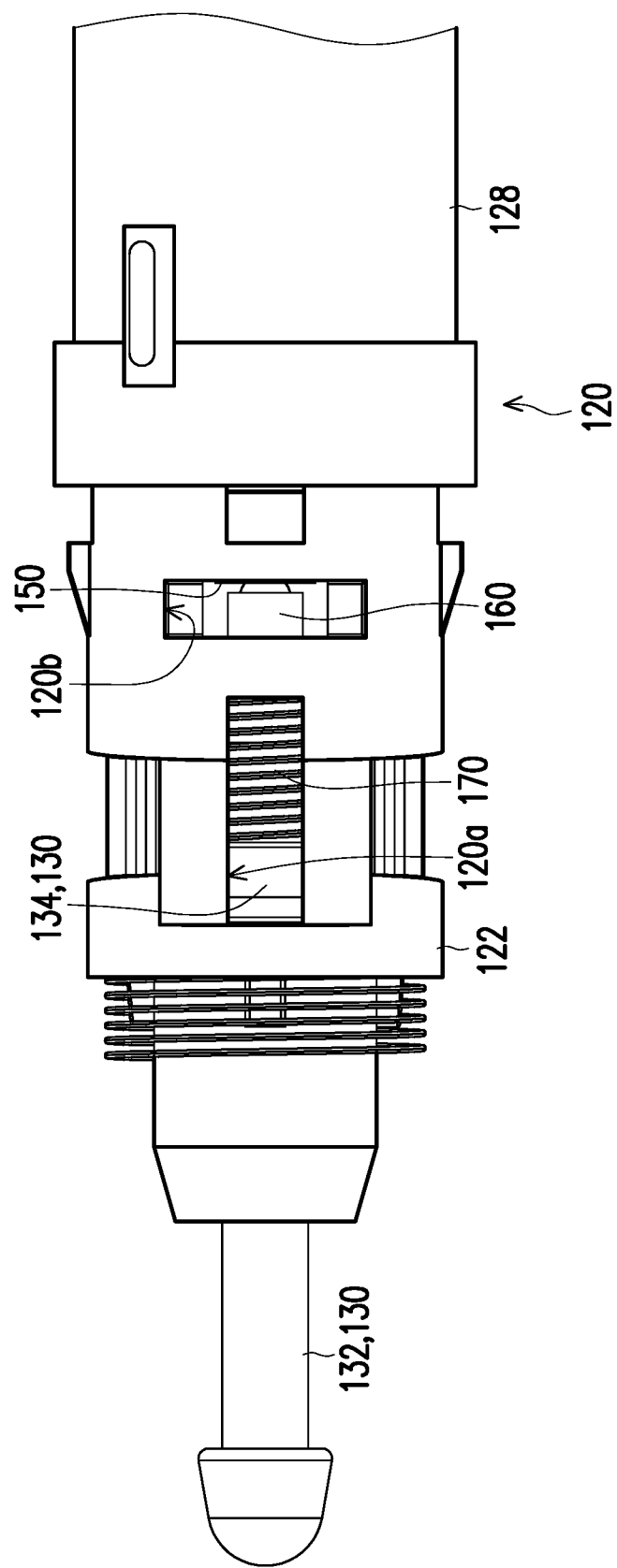
FIG. 6 is a bottom view of the stylus of FIG. 2.

FIG. 6 is a bottom view of the stylus of FIG. 2. Referring to FIG. 6, the carrying structure 120 of the present embodiment has two break holes 120a and 120b. At least a portion of the elastic member 170 is exposed by the break hole 120a in the radial direction of the stylus 100, and at least a portion of the trigger device 160 and at least a portion of the sensing device 150 are exposed by the break hole 120b in the radial direction of the stylus 100. Accordingly, during the assembly process, whether the positions of the elastic member 170, the trigger device 160, and the sensing device 150 are correct may be observed via the break holes 120a and 120b to ensure that the trigger device 160 and the sensing device 150 are accurately assembled in place by the confinement of the carrying structure 120. In other embodiments, the break hole 120a and the break hole 120b may be connected to form a single break hole.

Figure 7:
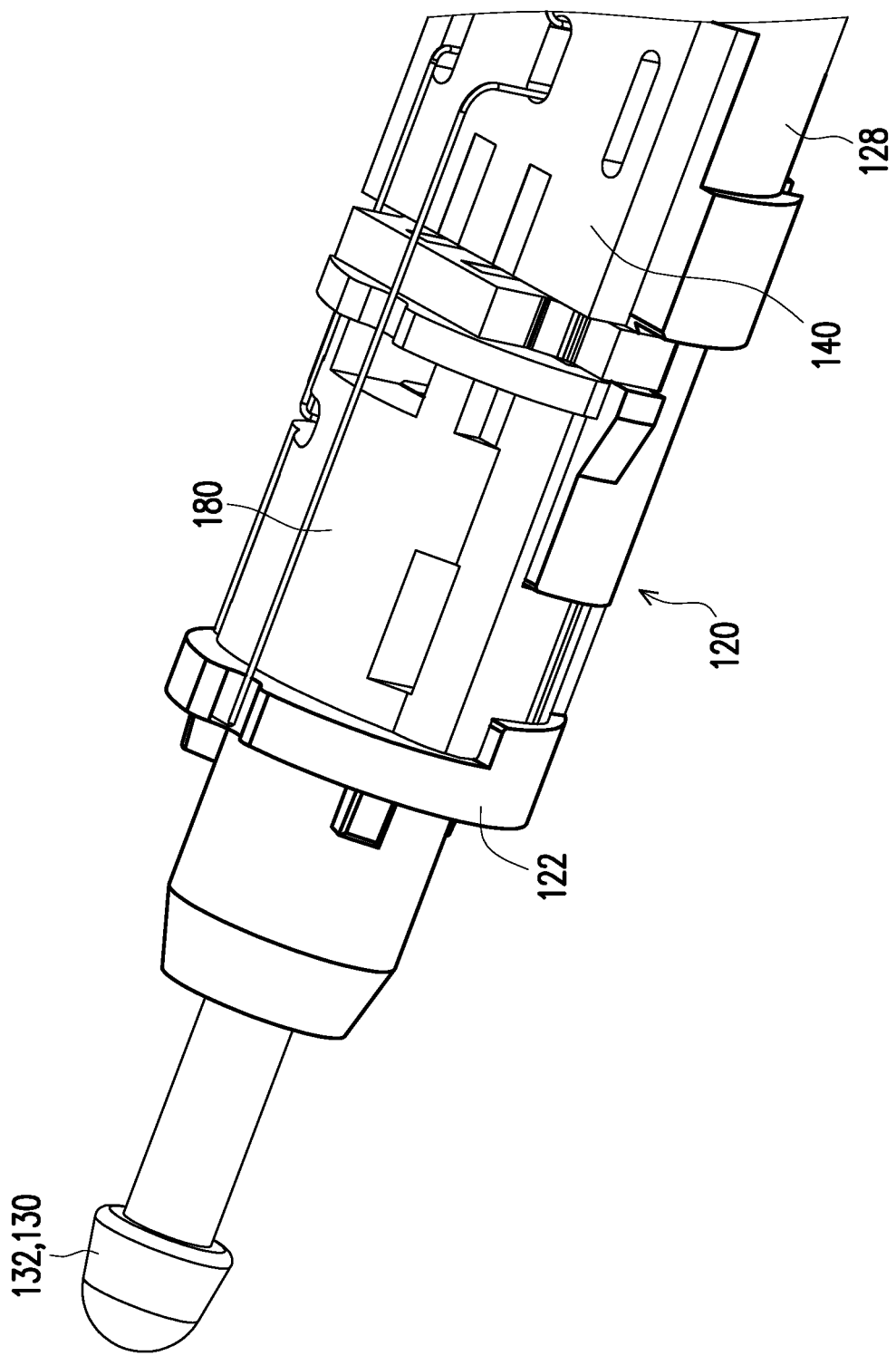
FIG. 7 shows that the carrying structure of FIG. 2 is provided with a cover thereon.

FIG. 7 shows that the carrying structure of FIG. 2 is provided with a cover thereon. Referring to FIG. 5 and FIG. 7, in order to make members such as the sleeve 134, the elastic member 170, and the trigger device 160 in FIG. 2 to be more stably disposed in the body 110 (shown in FIG. 1), the stylus 100 may further include a cover 180 combined with the carrying structure 120 to cover a portion of the sleeve 134 of the tip structure 130 and the elastic member 170 and a portion of the trigger device 160 on the sleeve 134. In other embodiments, the cover 180 may also be omitted and the configuration and confinement of the sleeve 134, the elastic member 170, the trigger device 160, and other members may be completed via only the carrying structure 120.

Based on the above, in the stylus of the invention, the carrying structure entirely surrounds the tip structure via the ring-shaped positioning portion thereof, so as to accurately position the tip structure to provide good concentricity thereto. Moreover, the ring-shaped positioning portion, the first stop portion, the second stop portion, and the carrying portion are an integrally formed structure, so that the assembly requirements such as the positioning of the tip structure, the confinement of the elastic member, and the carrying of the control circuit board are completed via only the carrying structure without providing a plurality of members to complete these assembly requirements. Therefore, the number of parts may be significantly reduced and assembly accuracy may be improved. In this way, the distance between the trigger device and the sensing device may be accurately controlled to ensure the trigger device and the sensing device have good touch sensing effect.

What is claimed is:

1. A stylus, comprising:
a body;
a carrying structure disposed at the body and having a ring-shaped positioning portion, wherein the ring-shaped positioning portion has an axial hole;
a tip structure disposed on the carrying structure and having a flange, wherein a segment of the tip structure penetrates the axial hole, and the ring-shaped positioning portion entirely covers the segment of the tip structure along a peripheral direction of the axial hole;
an elastic member, wherein the carrying structure has a first stop portion and a second stop portion opposite to the first stop portion, the elastic member is confined between the first stop portion and the tip structure, the tip structure is suitable for resisting an elastic force of the elastic member to be moved into the body and is suitable for resetting via the elastic force of the elastic member, and the flange is abutted against the second stop portion via the elastic force of the elastic member; and
a control circuit board, wherein the carrying structure has a carrying portion, the carrying portion carries the control circuit board, and the ring-shaped positioning portion, the first stop portion, the second stop portion, and the carrying portion are formed into a single piece, wherein
the ring-shaped positioning portion has a first end portion and a second end portion, the first end portion is close to the elastic member, the second end portion is tapered and away from the elastic member, and a diameter of the first end portion is greater than a diameter of the second end portion.

2. The stylus of claim 1, wherein the tip structure comprises a tip and a sleeve, the sleeve is sleeved at one end of the tip and penetrates the axial hole, and another end of the tip is extended out of the body.

3. The stylus of claim 1, comprising a sensing device and a trigger device, wherein the sensing device is disposed in the body, the trigger device is disposed at one end of the tip structure and faces the sensing device, and the tip structure is adapted to be moved into the body so that the trigger device is in contact with the sensing device.

4. The stylus of claim 3, wherein the carrying structure has a break hole, and the trigger device is exposed by the break hole in a radial direction of the stylus.

5. The stylus of claim 3, comprising a control circuit board, wherein the sensing device is coupled to the control circuit board, and the carrying structure carries the control circuit board.

6. The stylus of claim 1, wherein the elastic member is a spring and is sleeved at the tip structure, and two opposite ends of the spring are abutted against the first stop portion and the tip structure, respectively.

7. The stylus of claim 1, wherein the carrying structure has a break hole, and the elastic member is exposed by the break hole in a radial direction of the stylus.

8. The stylus of claim 1, comprising a cover, wherein the cover is combined with the carrying structure to cover a portion of the tip structure.

9. The stylus of claim 1, wherein the carrying portion, a portion of the tip structure and the elastic member are confined between the first stop portion and the second stop portion.

10. A stylus, comprising:
a body;
a carrying structure disposed at the body and having a ring-shaped positioning portion, wherein the ring-shaped positioning portion has an axial hole;
a tip structure disposed on the carrying structure, wherein a segment of the tip structure penetrates the axial hole, and the ring-shaped positioning portion entirely covers the segment of the tip structure along a peripheral direction of the axial hole;
an elastic member, wherein the ring-shaped positioning portion has a first end portion and a second end portion, the first end portion is close to the elastic member, the second end portion is tapered and away from the elastic member, and a diameter of the first end portion is greater than a diameter of the second end portion; and
a control circuit board, wherein the carrying structure has a first stop portion, a second stop portion, and a carrying portion, a portion of the tip structure and the elastic member are confined between the first stop portion and the second stop portion, the carrying portion carries the control circuit board, and the ring-shaped positioning portion, the first stop portion, the second stop portion, and the carrying portion are formed into a single piece.

* * * * *